(12) United States Patent
Atrash et al.

(10) Patent No.: US 8,964,418 B2
(45) Date of Patent: Feb. 24, 2015

(54) ULTRA-LOW AC-DC POWER CONVERTER TO MITIGATE ENERGY EMISSION

(76) Inventors: Amer Atrash, Dallas, TX (US); Wayne Chen, Plano, TX (US); Ross Teggatz, McKinney, TX (US); Brett Smith, McKinney, TX (US)

( * ) Notice: Subject to any disclaimer, the term of this patent is extended or adjusted under 35 U.S.C. 154(b) by 66 days.

(21) Appl. No.: 13/540,883

(22) Filed: Jul. 3, 2012

(65) Prior Publication Data

US 2013/0027986 A1 Jan. 31, 2013

Related U.S. Application Data

(60) Provisional application No. 61/504,293, filed on Jul. 4, 2011.

(51) Int. Cl.
*H02M 3/335* (2006.01)
*H02M 7/217* (2006.01)
*H02M 1/00* (2006.01)

(52) U.S. Cl.
CPC ........ *H02M 7/2176* (2013.01); *H02M 3/33507* (2013.01); *H02M 2001/0032* (2013.01); *Y02B 70/16* (2013.01)
USPC ..................................... 363/21.07; 363/21.15

(58) Field of Classification Search
USPC ..................... 363/21.04, 21.07, 21.12, 21.15; 323/901
See application file for complete search history.

(56) References Cited

U.S. PATENT DOCUMENTS

| | | | |
|---|---|---|---|
| 6,188,587 B1 * | 2/2001 | Yun et al. .................... | 363/21.18 |
| 7,064,968 B2 * | 6/2006 | Choi et al. ...................... | 363/97 |
| 7,701,739 B2 * | 4/2010 | Mollo ........................... | 363/142 |
| 2002/0190579 A1 * | 12/2002 | Odaohhara et al. ........... | 307/126 |
| 2003/0178976 A1 * | 9/2003 | Xi ................................. | 323/273 |
| 2004/0076022 A1 * | 4/2004 | Hong et al. ................ | 363/21.01 |
| 2006/0265181 A1 * | 11/2006 | Stewart ......................... | 702/178 |
| 2011/0102411 A1 * | 5/2011 | Chang et al. .................. | 345/212 |
| 2012/0139477 A1 * | 6/2012 | Oglesbee et al. ............. | 320/107 |
| 2012/0206947 A1 * | 8/2012 | Haight et al. ................... | 363/84 |
| 2012/0212981 A1 * | 8/2012 | Lin ............................ | 363/21.15 |

\* cited by examiner

*Primary Examiner* — Monica Lewis
*Assistant Examiner* — Emily P Pham
(74) *Attorney, Agent, or Firm* — Hovey Williams LLP

(57) ABSTRACT

An AC to DC converter system is disclosed in which a conversion circuit for converting an AC input signal to a DC output signal is operably coupled with a communication circuit designed for sensing output indicative of the presence or absence of a load at the DC output. The system is designed so that the conversion circuit operates in an inactive standby state when there is no load, and in an active state for supplying DC power when a load is present. The system is configured to operate using ultra-low power.

11 Claims, 6 Drawing Sheets

ULTRA-LOW AC-DC POWER CONVERTER TO MITIGATE ENERGY EMISSION

PRIORITY ENTITLEMENT

This application is entitled to priority based on Provisional Patent Application Ser. No. 61/504,293, filed on Jul. 4, 2011, which is incorporated herein for all purposes by this reference. This application and the Provisional Patent Application have at least one common inventor.

TECHNICAL FIELD

The invention relates to the more efficient utilization of energy resources and energy conservation. More particularly, the invention relates to electronic systems for conversion of an alternating current (AC) to a direct current (DC), and to the use of ulra-low power converters to power DC devices and/or charge DC energy storage apparatus.

BACKGROUND OF THE INVENTION

It is known to design power supply, converter, and charger systems to receive an AC power source as input power, and to convert the AC power to DC power for the output. A disadvantage of many such systems is that they remain active, and consume power, even when there is no load on the output. Such systems, configured for using an AC power source for powering electronic apparatus and/or for charging DC energy storage apparatus, such as batteries, are common. Frequently, such AC/DC adapters and chargers are left plugged in to an AC source even when no DC power is required. In other words, they continue to convert their AC input into DC for output, thereby consuming power, even when no output is needed. The AC/DC converter topologies commonly used in the arts tend to share this same basic characteristic due to their physical and electrical structure. This inherently leads to decreased efficiency and possibly a reduction in system longevity.

Due to these and other problems and potential problems with the current state of the art, improved methods, apparatus, and AC/DC conversion and charger systems would be useful and advantageous additions to the art.

SUMMARY OF THE INVENTION

In carrying out the principles of the present invention, in accordance with preferred embodiments, the invention provides advances in the arts with novel methods and apparatus directed to providing AC/DC converters, adapters, and charging systems with capabilities for detecting load conditions and halting the AC to DC conversion when the load does not require it. In preferred embodiments, the system enters into an ultra-low power standby mode until output power is needed at the load, and/or until a standby mode power supply residing with the converter is replenished for another ultra-low power standby operation cycle.

According to one aspect of the invention, in an example of a preferred embodiment, an AC/DC converter system is configured for receiving an AC power input signal and converting the input signal to a DC output signal. A communication circuit is provided for sensing an output parameter and for switching the conversion circuit between an active state and an inactive state in response to the sensed output parameter.

According to another aspect of the invention, in an exemplary preferred embodiment, the system described immediately above also includes a power storage device in the enabling circuit for supplying power thereto.

According to still another aspect of the invention, preferred embodiments of the system of the invention include systems wherein the DC output is operably coupled with portable electronic apparatus.

According to yet another aspect of the invention, a preferred embodiment of an AC to DC converter system has an input for receiving an AC input and a conversion circuit for converting the AC input signal to a DC output signal. A communication circuit is adapted to provide feedback for use in switching the conversion circuit between an active state and an inactive state in response to load requirements.

According to another aspect of the invention, in an example of a preferred embodiment, an AC to DC converter system has an AC power input and a conversion circuit for converting the AC signal to a DC output signal. A communication circuit configured to facilitate switching the conversion circuit between an active state and an inactive state in response to a sensed parameter or a load switch, is capacitively coupled for receiving power from the AC input.

The invention has advantages including but not limited to one or more of the following; providing efficient AC to DC power conversion at a range of operating levels and/or providing an ultra-low power standby mode adaptable to real time load conditions. These and other advantageous features and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

While the making and using of various exemplary embodiments of the invention are discussed herein, it should be appreciated that the present invention provides inventive concepts which can be embodied in a wide variety of specific contexts. It should be understood that the invention may be practiced with various alternative components without altering the principles of the invention. For purposes of clarity, detailed descriptions of functions, components, and systems familiar to those skilled in the applicable arts are not included. In general, the invention provides power supply, conversion, and charger control capabilities useful in a variety of applications and systems.

The present patent application is related to U.S. patent application Ser. No. 12/710,307. The related applications share at least one common inventor and have a common assignee. Said related application is hereby incorporated herein for all purposes by this reference.

Figure 1:
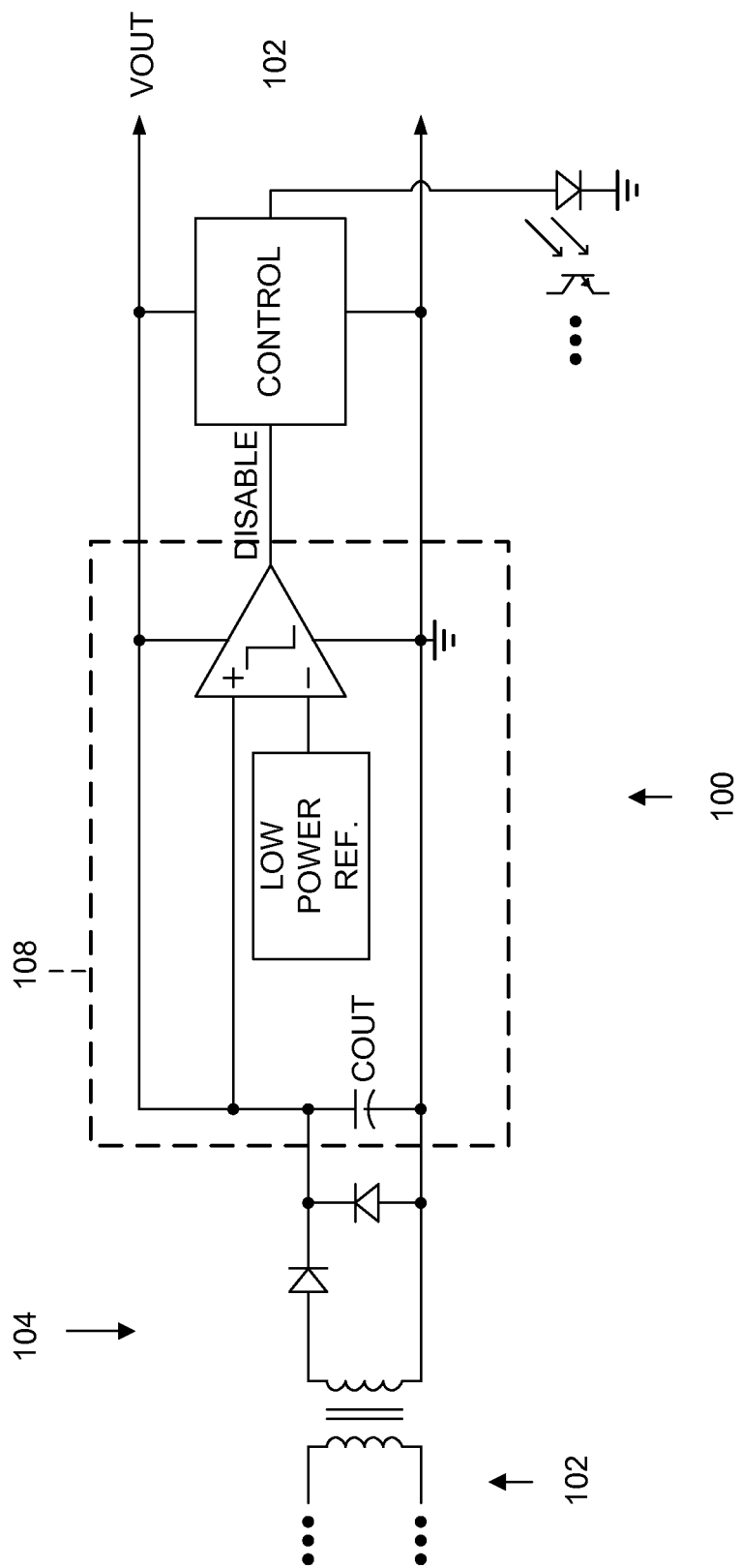
FIG. 1 is a simplified schematic drawing of an example of a preferred embodiment of a circuit for sensing real time power requirements for use in AC/DC power conversion systems according to the invention.

In general, the invention provides circuits and systems by which AC to DC adapters and/or chargers may be enabled during periods when a DC load is detected, and by which they may be placed in a low power standby state during periods when it is detected that AC/DC conversion is not required. The low power circuits and systems in presently preferred embodiments also include capabilities for ensuring that the system has access to sufficient power to operate in standby mode for significant periods of time, preferably including the capability for replenishing energy stored for use in standby mode. Referring primarily to FIG. 1, an AC to DC converter circuit 100 has an input 102 configured for receiving an AC power input signal and a power conversion circuit 104, typically including transformers and rectifiers as known in the art, for converting the AC input signal to a DC output signal appropriate for delivery to a DC load at an output node 106. The DC load(s) connected to the output 106 may constitute one or more DC-operated circuits and/or battery and/or other DC power storage devices or arrays of such devices. Deployed between the power conversion circuit 104 and the output 106, an enabling circuit 108 is configured to sense one or more output parameter associated with the output 106, and is further configured for switching the power conversion circuit 104 between an active state and an inactive standby state in response to the sensed output parameter. In this example of a preferred embodiment, the enabling circuit 108 includes a low power, preferably on the order of nano-amps (nA), comparator 110 for sensing the DC output voltage ($V_{OUT}$) at the output node 106. Those skilled in the arts will appreciate that the enabling circuit 108 comparator 110, or other component, may alternatively be configured to sense other output parameters such as, for example, current, power, impedance, capacitance, magnetic field(s), or to receive an external signal such as a wireless transmission or timing signal. An alternative implementation, for example, may include a comparator configured for monitoring output current instead of output voltage. If sufficient output voltage is available and the output current is below a certain predetermined threshold, then the power conversion circuit 104 is not needed for supplying output current, and is placed in its standby state. When the output voltage drops below a certain predetermined threshold, or when the output current exceeds a certain threshold, the conversion circuitry 104 is again operated in the active state to supply the output current. It is believed that for many applications, monitoring output current without monitoring the output voltage will be sufficient for control of the system 100.

The enabling circuit 108 is preferably operated using power from an energy storage device provided for that purpose, such as a battery or capacitor, e.g., $C_{OUT}$ in FIG. 1. During operation of the power conversion circuit 104 in its active mode, the comparator 110 may be operated using output from the conversion circuitry 104, and/or from the dedicated storage device, e.g., capacitor $C_{OUT}$. Preferably, when a load is detected at the DC output 106 by the enabling circuit 108, the power conversion circuit 104 is activated for converting an AC signal received at the input 102 into a DC signal at the output terminal 106 connected to the detected load (not shown). Preferably, the comparator 110 is configured to detect, based on one or more selected parameter(s) reaching selected threshold(s), whether operation of the power conversion circuitry 104 in either an active state or inactive standby state is required. Preferably, when no load is detected at the DC output 106, the power conversion circuit 104 is placed in an inactive standby state. While the power conversion circuit 104 is in the standby state, the comparator 110 is powered by power stored in the enabling circuit 108, in this example a charge stored on the capacitor $C_{OUT}$. Since the comparator 110 is preferably configured to operate with extremely low quiescent current, a relatively small sized capacitor $C_{OUT}$ provides significant operating time. When the voltage on the capacitor $C_{OUT}$ drops below a predetermined threshold level, the power conversion circuitry 104 is activated. During the operation of the power conversion circuit 104 in this active state, the charge on the capacitor $C_{OUT}$ is replenished. When the sensed output parameter, in this example voltage ($V_{OUT}$), reaches a predetermined threshold the power conversion circuitry 104 turns off, entering the inactive state, and only the low-power comparator 110 remains on, minimizing the system 100 power consumption.

Figure 2:
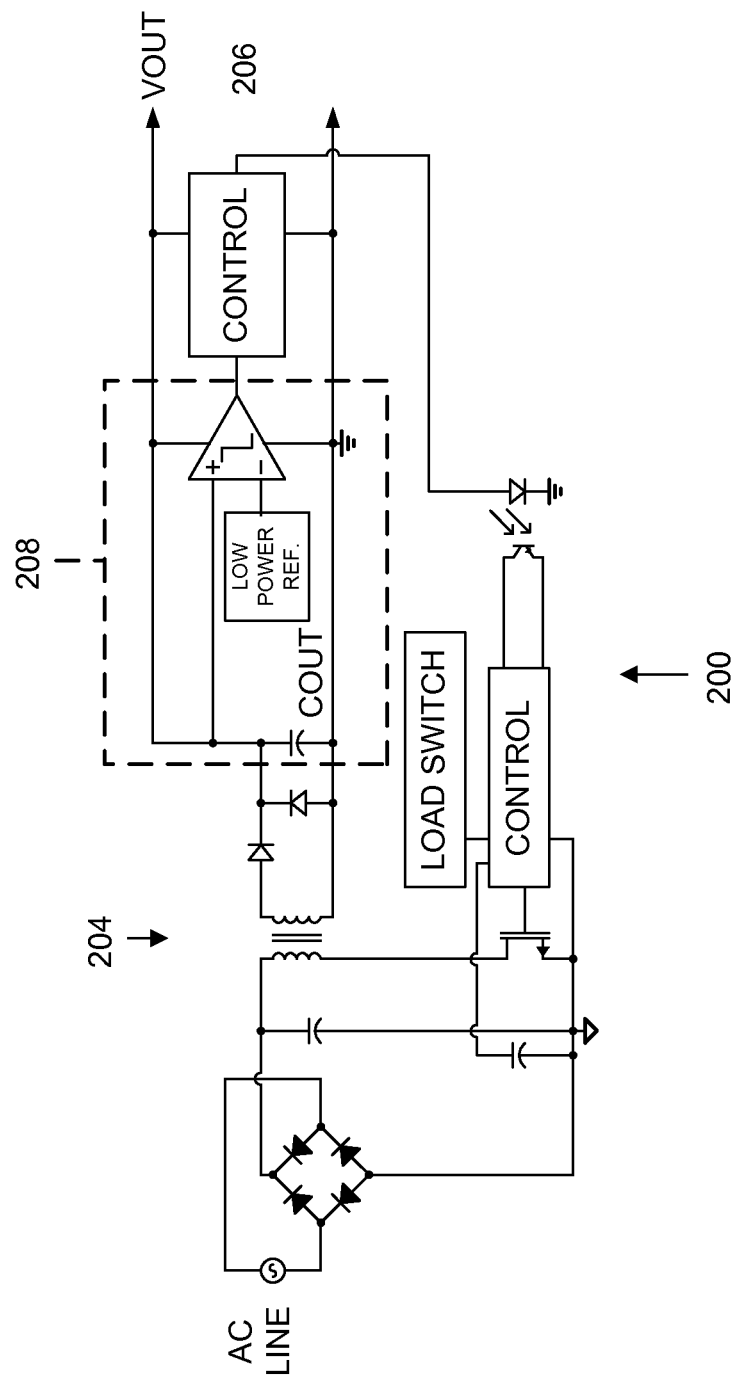
FIG. 2 is a simplified schematic drawing showing an example of another preferred embodiment of low power converter circuitry according to the principles of the invention.

In an alternative embodiment of the invention, an example of which is illustrated in FIG. 2, the parameter monitored for making the determination of when to switch the conversion circuitry 204 to or from the active or standby mode may be a signal communicated by a load connected to the output 206. The system 200, as illustrated in FIG. 2, may be configured such that a load connected at the output 206 communicates to the AC/DC converter 204 using a periodic, watchdog type protocol, wireless signal, or other serial/parallel communication. Using this configuration, the enabling circuit 208 receives a signal from the load communicating that power is required to be supplied at the output 206. Accordingly, the enabling circuit 208 causes the conversion circuit 204 to operate in the active mode. When a signal is received indicating that power is not required at the output 206, the enabling circuit 208 causes the conversion circuit 204 to enter the standby mode and stop consuming and supplying power. The enabling circuit 108 then continues to monitor the output 206 for a signal which would again cause it to place the converter circuit 204 in the active state.

Figure 3:
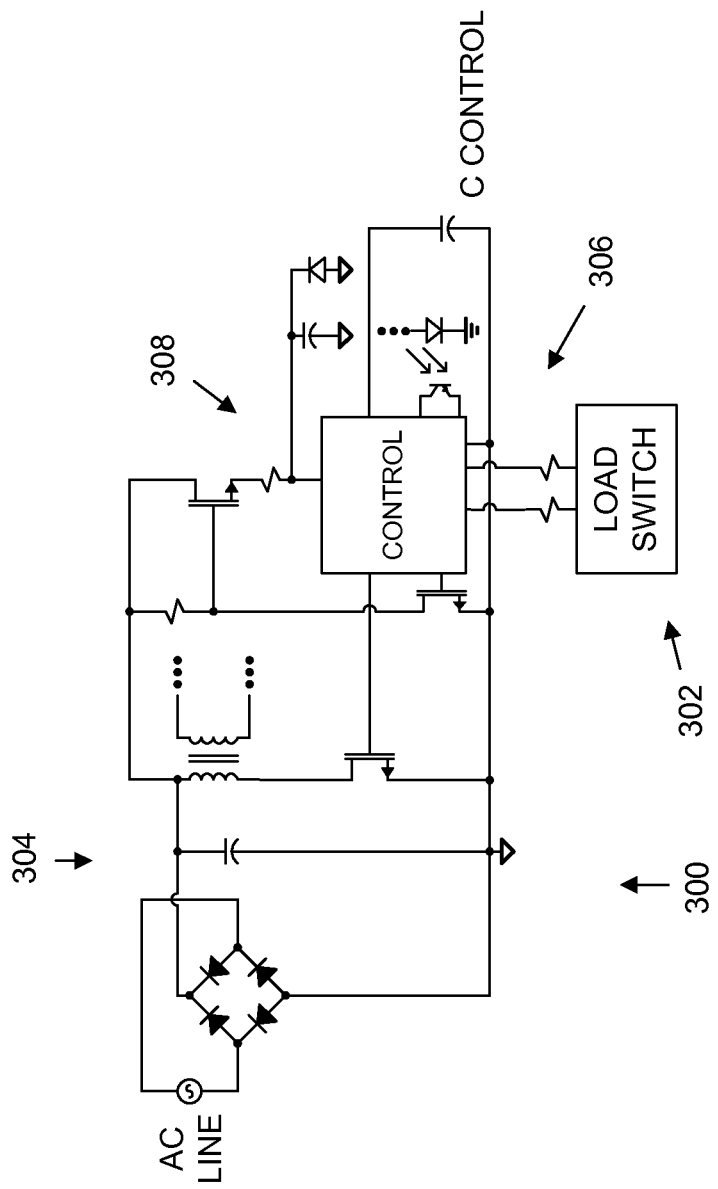
FIG. 3 is a simplified schematic drawing illustrating another example of an alternative preferred embodiment of low power converter circuitry according to the invention.

Now referring primarily to FIG. 3, an alternative implementation of the invention is shown. In this circuit 300, the presence of a load at the output 306 is detected by the operation of a switch 302, preferably located in the adapter plug in typical power converter applications. When a load is present at the output 306, the converter circuit 304 is enabled by operation of the enabling circuit 308. When no load is detected at the output 306 by operation of the switch 302, the power conversion circuitry 304 is placed in its inactive standby state and the enabling circuit 308 is placed in low power mode, drawing its power from an associated power storage device, in this example capacitor $C_{CONTROL}$. The load switch 302 can be implemented in a variety of ways as long as communication with the enabling circuit is provided. In a preferred embodiment, a mechanical switch is used. The switch is activated by the completion and/or removal of a physical connection to the output node 306, e.g., by insertion or removal of a suitable output jack 306 into compatible apparatus. In alternative implementations, a proximity switch, such as a capacitive, inductive, optical, magnetic, resistive, or infrared sensor activated switch may be used without departure from the invention.

Figure 4:
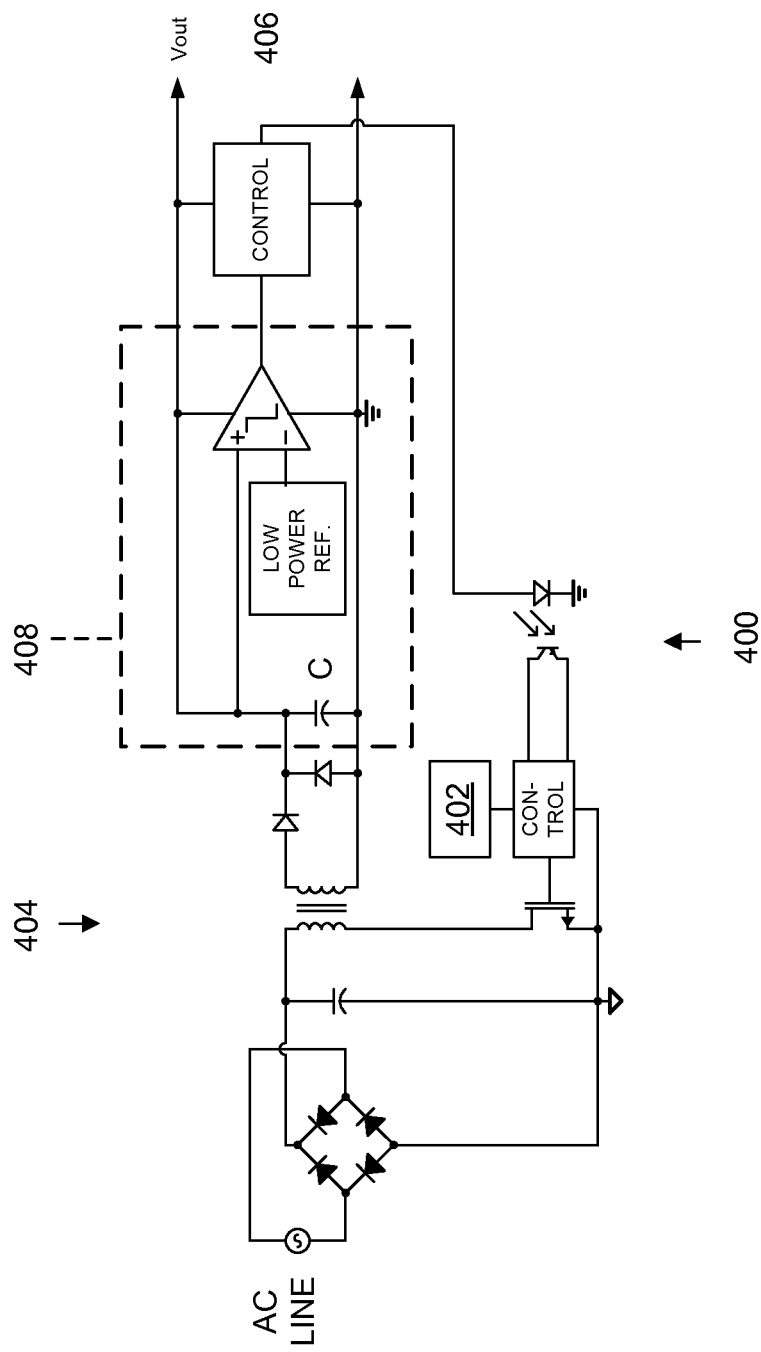
FIG. 4 is a simplified schematic drawing of an example of an alternative preferred embodiment of low power converter circuitry according to the invention.

Additional embodiments of the low power converter of the invention further address the challenge of guaranteeing system startup when the converter system has been idle for an extended period of time. In such a scenario, the power storage element of the enabling circuit, e.g., the output capacitor $C_{OUT}$ of FIG. 1, may be completely discharged. An alternative embodiment of low power converter circuitry is shown in FIG. 4. A timer 402 is coupled to the primary side 404 of the power conversion circuit 404. In this configuration, the system 400 may be configured to automatically turn on periodically and convert power in its active state for a brief period of time. Thus, the output capacitor C, or other suitable energy storage device, may be recharged from time to time, ensuring that the system 400 retains sufficient power to continue monitoring the output 406 for detection of demand for DC output requiring the operation of the power conversion circuit 404 in its active mode. It is contemplated that the timer-induced "on" period can be relatively brief, thus the overall amount of power consumed by the forced turn-on remains small. As an alternative to the use of a timing signal, additional external signals may be used such as wired or wireless communications signals suitable for causing the conversion circuitry 404 to recharge the enabling circuit 408 power source, e.g., storage capacitor C, as shown, or other suitable storage device.

Figure 5:
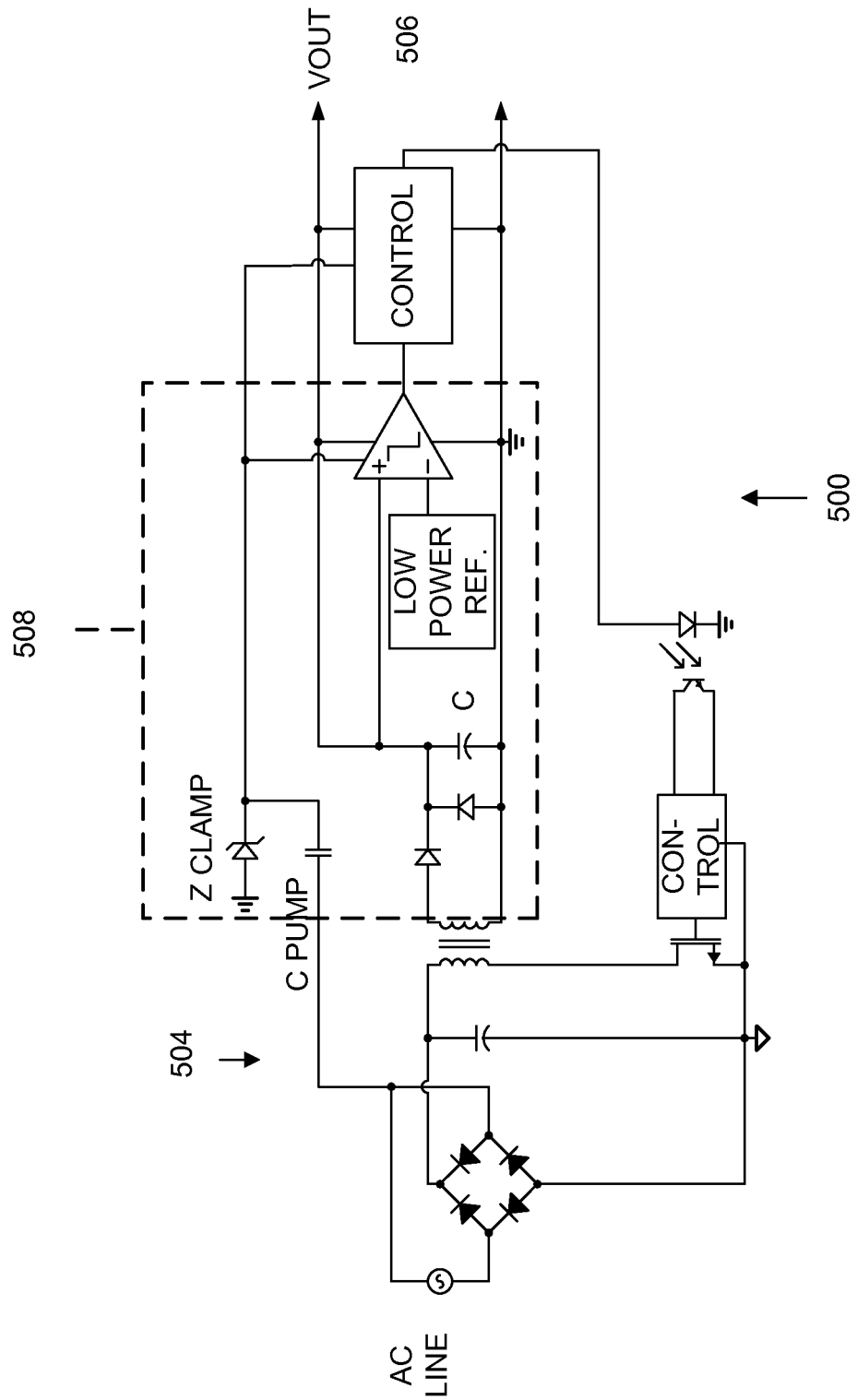
FIG. 5 is a simplified schematic drawing of a preferred embodiment of low power converter circuitry according to the invention.

As illustrated in the schematic diagram of FIG. 5, an alternative embodiment of the low power converter 500 has been developed in which capacitive coupling may be used to provide startup power for the enabling circuit 508. As indicated by arrow 502, the AC signal on the primary side of the conversion circuit 504 operates to pump charge across the capacitor $C_{PUMP}$, providing a start-up voltage for the enabling circuit 508 connected with the secondary side 510 of the conversion circuit 504. A Zener diode $Z_{CLAMP}$ coupled between the enabling circuit 508 and ground is preferably used to limit the voltage sufficiently to protect the circuit 500 from over voltage. The size of the capacitor $C_{PUMP}$ may be selected to limit the power transmission to the secondary side 510 of the conversion circuit 504, and thus also limit the total power dissipated by the enabling circuit 508 in this configuration.

Figure 6:
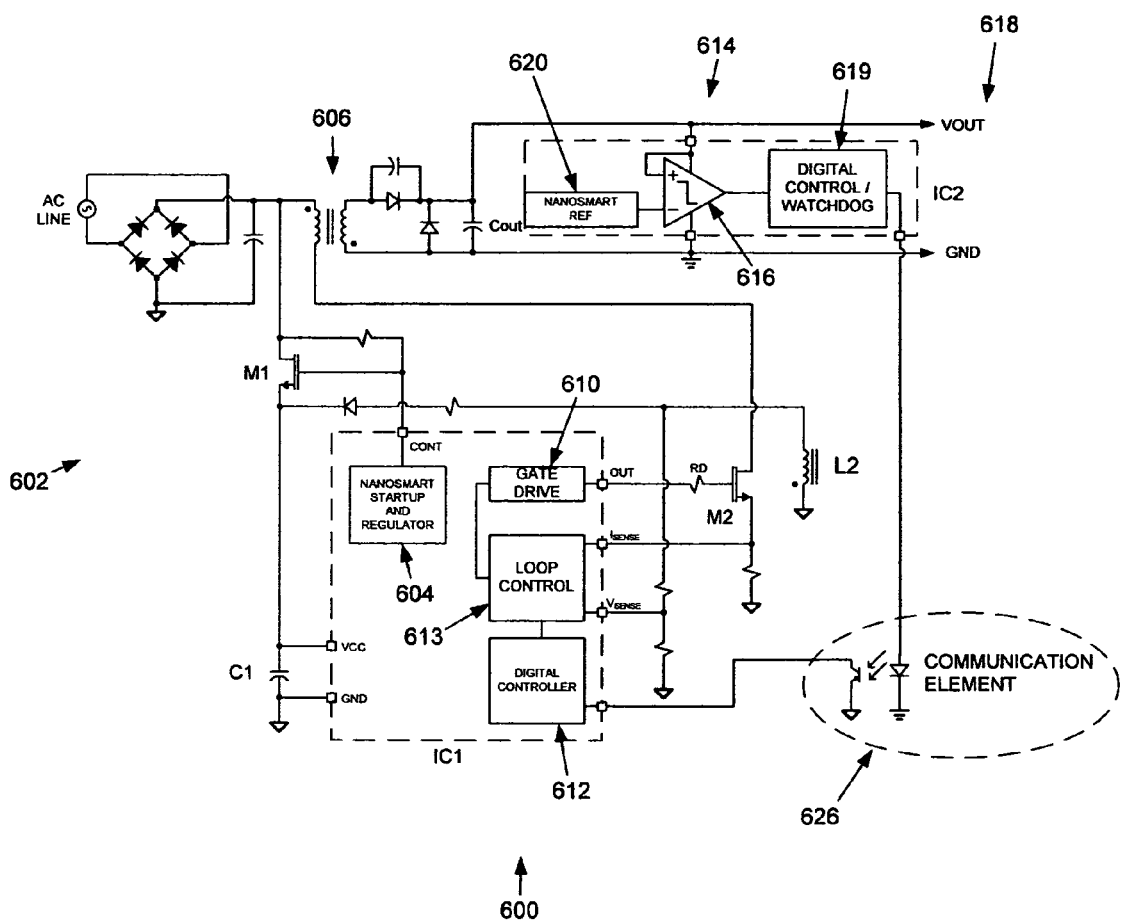
FIG. 6 is a simplified schematic drawing of an example of a preferred embodiment of low power converter circuitry according to the invention.

An additional implementation of a preferred embodiment of a low power converter system is illustrated in FIG. 6. In this circuit 600 implementation, startup on the primary side 602 is guaranteed using an ultra-low power regulator 604. This regulator 604 is designed to turn on from the rectified incoming power (CONT) and regulate its output (VCC) appropriately. This regulator 604 is preferably constructed use minimum (nano-amps or lower) practicable bias current. This bias current is preferably be dynamic in nature, so that the regulator stability or other performance parameters adjust based on the regulator loading or other parameters. The reference voltage of this regulator 604 can be implemented using a floating gate technique, low power bandgap, multiple floating gates for redundancy or accuracy, a bandgap operating at a less than 100% duty cycle, a combination of a floating gate reference and a bandgap used to calibrate or re-program the floating gate to compensate for retention losses in the floating gate, or other low power or conventional technique. Use of an ultra-low power regulator, e.g., 604, enables the system 600 to enter an ultra-low power mode where the device state is not lost and regulation can be maintained with a minimum power loss overhead. This LDO can be implemented according to the principles of the invention using any of a large number of regulator topologies with either a FET or a bipolar output stage.

An additional advantage of this ultra-low power architecture 600 is that the regulator 604 does not require high voltage tolerance. It can be seen that the CONT node is limited by the regulator 604 to the level of VCC, plus the threshold voltage of the external FET. The CONT pin may also be optionally provided with an additional decoupling capacitor to improve system stability. To further improve system 600 efficiency after startup, the power for the primary side 602 can be provided by an additional winding or additional taps on the transformer 606. This provides an efficient power conversion from the high voltage input to the lower voltage required to power the primary side 602 circuits.

In an additional variation of the circuit architecture 600 introduced in FIG. 6, it may be preferable in some applications to remove the transistor device M1. In a system with this device (M1) omitted, the primary-side 602 starts up from the CONT pin. An additional capacitor can be placed from CONT to GND to provide sufficient energy storage to facilitate startup, but is not required. After the initial startup of the system 600, power is supplied from the transformer 606 to VCC.

The invented ultra-low power converter architecture 600 also facilitates the implementation of a number of additional improvements on the primary side 602. The first is clock dithering to reduce emissions. Using either digital control of the gate drive 610 frequency or analog distortion of the gate drive 610 signal, the transistor M2 switching frequency can be varied continuously during operation. This limits the amount of energy emitted at any particular frequency of operation. Further mitigation of emission may be realized with M2 gate drive 610 slew control. Emissions can be reduced by limiting or otherwise controlling the M2 gate drive 610 slew rate. This can be achieved using a driver 610 with variable resistance, a driver with a dynamically adjustable or resistively limited supply, staged turn-on of multiple portions of the driver circuit, use of a single or multiple current sources to drive the gate, or use of an optional external resistor RD as shown in FIG. 6. The controller 612 can also be used to limit the switching frequency of the FET M2. This helps constrain the frequency of emitted energy and can prevent emission in the audio band, which may be particularly advantageous in some application contexts.

To further improve performance, i.e., attenuate radiated emissions, soft switching can be implemented on the primary side controller 612. In this technique, the timing of the gate driver 610 signal is adjusted to minimize the magnitude and occurrence of current spikes in the system 600.

It has been determined that system 600 cost can also be reduced by removing the L2 winding from the system 600 illustrated in FIG. 6. This is done however at the expense of increasing power dissipation in the primary side 602. In embodiments with L2 removed or omitted, the transistor M1 acts as a shunt regulator, and needs to hold off the voltage between the rectified AC signal and the voltage required by IC1.

The control on the primary 602 side can be done using all analog, all digital, or any other partitioning of analog and digital circuits. Loop control 613 can be achieved using any combination of voltage or current sensing on the primary side 602, or voltage or current sensing on the secondary side 614 with the use of an isolated element, or other communication element. The digital controller 612 preferably has the capability to adjust the loop parameters or compensation based on any sensed parameter, such as input or output current or voltage, temperature, or user input.

The secondary side 614 of the system 600 preferably uses an ultra-low power comparator 616 to monitor the output supply 618, a digital control 619 and a zero-power or low-power reference 620. The output supply 618 may be monitored by another technique, such as an analog-to-digital converter, a threshold detector, or any other comparator. The digital control 619 and zero-power reference 620 may also be implemented in a number of alternative configurations, including many standard analog techniques or techniques as mentioned herein for the primary side 602. This system 600 uses a watchdog timer, e.g., 616, to guarantee system 600 operation. When powered, the secondary side 614 sends a communication signal to the primary side 602 periodically, using the isolated communication path provided. The timer interval can be relatively long in order to minimize the total on-time of the secondary side 614 in the absence of a load. In the event the primary side 602 does not receive a communication signal within a pre-selected time-out window, this indicates that the secondary side is not powered, and that the system 600 may be placed in a startup or restart mode to provide the Vout voltage. By increasing the timer interval and reducing the power required to send communication signals, the total power dissipation of the secondary side 614 can be reduced to a few micro-watts or less.

In preferred embodiments, the comparator 616 on the secondary side 614 of the circuit 600 senses if a load transient or other load condition forces the Vout to less than the desired setpoint. In a traditional system, this event can cause a system to become locked into an off-state. In the preferred architecture of the invention, the secondary side 612 sends an appropriate communication to the primary side 602, which responds accordingly by sending more power, or by another pre-defined response. In the event a load transient pulls Vout to a level below which the secondary side 612 can operate, the secondary side 612 can also no longer send watchdog communication and the system 600 times-out and restarts.

In an example of further variations of preferred embodiments, the optical element 626 in these exemplary circuit architectures 600 can be replaced with other interface elements. Some acceptable options include, for example, capacitively coupled, inductively coupled, mechanical, or electro-mechanical elements. Capacitive or inductive elements may be implemented using discrete components or printed as part of a PCB. In a printed PCB, a capacitively coupled element can be formed from two or more lines or structures that are stacked vertically using two or more planes or placed adjacent in the same plane. Inductive elements can be formed in a variety of structures, such as vertically stacked or interleaved coils. These can be placed on one or more levels of the PCB. They can also be placed on one or more separate PCBs.

The methods and apparatus of the invention provide one or more advantages including but not limited to improved efficiency in power supply, AC/DC conversion, and energy storage apparatus charging systems. While the invention has been described with reference to certain illustrative embodiments, those described herein are not intended to be construed in a limiting sense. For example, variations or combinations of steps or materials in the embodiments shown and described may be used in particular cases without departure from the invention. The circuit topologies and techniques described and illustrated herein can be applied to other isolated or non-isolated power converter systems and may be used singularly or in any combinations without departure from the principles of the invention. Modifications and combinations of the illustrative embodiments as well as other advantages and embodiments of the invention will be apparent to persons skilled in the arts upon reference to the drawings, description, and claims.

We claim:

1. An ultra-low power converter comprising:
   a primary side having a primary side ultra-low power regulator being configured to turn on in response to rectified incoming power (CONT) and to regulate its output (VCC), the ultra-low power regulator being configured to operate using dynamic ultra-low bias current of nano-amps or lower, said primary side further comprising a primary winding and a controllable switch connected between the primary winding and ground;
   a control circuit being configured to control the controllable switch frequency in order to mitigate energy emissions from the primary side by adjusting a gate drive slew rate of the controllable switch; and
   a secondary side communication circuit configured to signal the primary side ultra-low power regulator in response to a load condition;
   whereby the primary side ultra-low power regulator allows the ultra-low power converter to operate in an ultralow power mode such that the device state of the ultra-low power converter is not lost and regulation is maintained with a low power loss overhead.

2. The ultra-low power converter according to claim 1 wherein the secondary side communication circuit further comprises an optical element.

3. The ultra-low power converter according to claim 1 wherein the DC output of the ultra-low power converter is operably coupled with portable electronic apparatus.

4. The ultra-low power converter according to claim 1 wherein the DC output of the ultra-low power converter is operably coupled with portable communications apparatus.

5. The ultra-low power converter according to claim 1 wherein the DC output of the ultra-low power converter is operably coupled with portable imaging apparatus.

6. The ultra-low power converter according to claim 1 wherein the DC output of the ultra-low power converter is operably coupled with portable display apparatus.

7. The ultra-low power converter according to claim 1 wherein the DC output of the ultra-low power converter is operably coupled with portable audio apparatus.

8. The ultra-low power converter according to claim 1 wherein the DC output of the ultra-low power converter is operably coupled with portable computing apparatus.

9. An AC to DC converter system comprising:
   an AC input configured for receiving an AC power input signal;
   a conversion circuit for converting the AC input signal to a DC output signal, the conversion circuit operably coupled with the input, and also coupled with an output for outputting the DC output signal; and
   a communication circuit configured to signal the conversion circuit in response to a load condition;
   a capacitive circuit coupling a primary side of the conversion circuit and the communication circuit, the capacitive circuit further comprising a Zener diode operably coupled between an enabling circuit, a capacitor element, and ground, in a configuration for limiting a voltage which may be provided from the primary side of the conversion circuit to the communication circuit;
   whereby the conversion circuit is configured to selectively operate in a conversion mode and in an ultra-low power standby mode.

10. The AC to DC converter system according to claim 9 wherein the communication circuit further comprises an optical device.

11. The AC to DC converter system according to claim 9 further comprising a capacitive coupling configured for providing power from the AC input to the communication circuit.

* * * * *